Jan. 8, 1924.

C. M. WALES

LIGHTING STRUCTURE

Filed Jan. 30, 1922

1,480,428

Patented Jan. 8, 1924.

1,480,428

UNITED STATES PATENT OFFICE.

CHARLES M. WALES, OF NEW YORK, N. Y.

LIGHTING STRUCTURE.

Application filed January 30, 1922. Serial No. 532,545.

*To all whom it may concern:*

Be it known that I, CHARLES M. WALES, a citizen of the United States, and a resident of the borough of Manhattan, city, county, and State of New York, have invented certain new and useful Improvements in Lighting Structures, of which the following is a specification.

My invention relates to an improvement in lighting structures and an object thereof is the provision of a structure wherein the objectionable glare therefrom will be eliminated.

Specifically, my invention is directed to an improved headlight wherein the lighting unit is divided into two compartments with an illuminative element or lamp in each compartment and whereby when desired, upon the approach of other vehicles for example, the lamp in one compartment may be turned off thus preventing blinding of the driver of the approaching vehicle from the glare of the headlight but at the same time permitting the roadway to one side of my improved device to be flooded. By this construction it will be seen that from a safety standpoint driving conditions will be greatly improved.

In the accompanying drawings wherein I have illustrated my invention as applied to a headlight for an automobile,—

Figure 1:
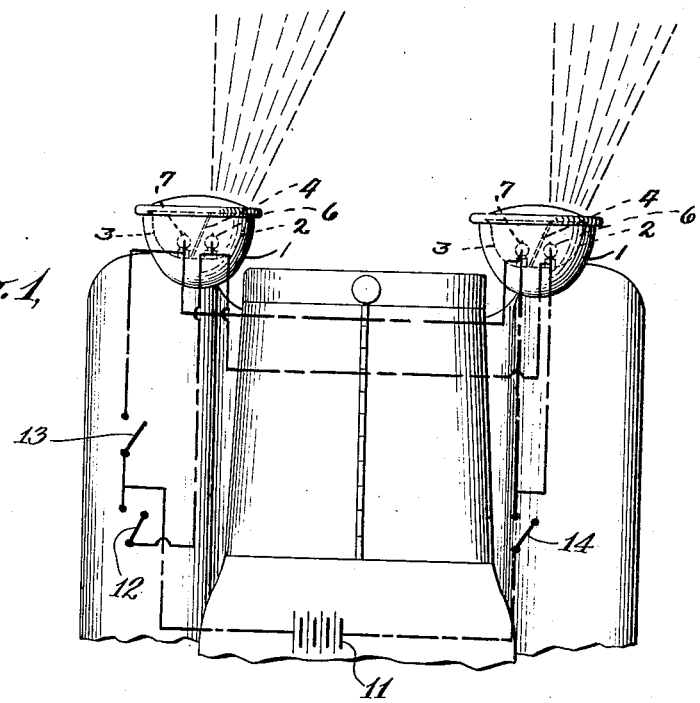
Figure 2:
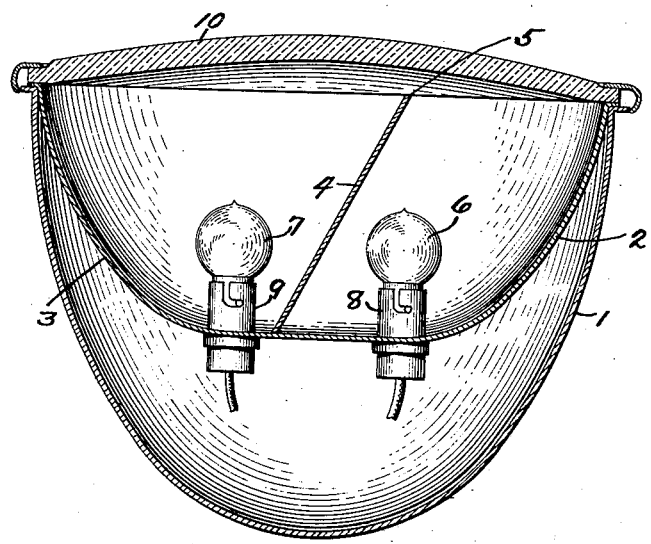

Fig. 1 shows a pair of my improved lighting structures applied to an automobile; and Fig. 2 shows one of these devices in sectional plan.

Referring to the drawings in detail,—1 designates the usual headlight casing. I provide this casing with the sides designated 2 and 3, of a pair of parabolic reflectors connected to each other by a structure which is curved vertically, but flat, in a horizontal section, and extending vertically of these reflectors is a partition of some opaque, preferably reflecting, material 4. This partition extends from the bottom of the reflectors to the top thereof so as to divide the headlight structure into what I have termed two compartments, the forward end 5 of the partition being substantially in line with the focus of the reflector 2. At the focus of each reflector section I mount an illuminative element or lamp which I have designated 6 and 7, these lamps being mounted in holders 8 and 9. The forward end of the headlight is provided with the usual lens 10.

In ordinary driving the lamps 6 and 7 will both be kept lighted, power being supplied from the battery 11, the circuit of the lamps being controlled by the switches 12, 13 and 14. When approaching other vehicles or when approaching pedestrians the lamps 7 may be extinguished by opening the switch 13, the lamps 6, however, being left alight. Inasmuch as the partition 4 extends diagonally until it is practically in line with the focus of the reflector 2 it will be seen that the light rays from the lamps 6 will be directed to the right-hand side of the road only and hence all blinding of the drivers of approaching vehicles is eliminated. This arrangement has a further advantage, of course, in that the driving side of the road being fully illuminated, probability of ditching of the vehicle is avoided. It will be understood, of course, that in those sections where the left-hand side of the road is the driving side the partition 4 will project to the left instead of to the right.

It will be seen, therefore, that I have provided a unitary lighting structure wherein when employed as a headlight the driver is protected in that the roadway to his right is illuminated, yet the danger of blinding of the drivers of vehicles to his left or of pedestrians is overcome.

I claim:

1. A lighting structure comprising side portions of two parabolic reflectors, said reflector portions being joined to each other by an intermediate portion, a vertically extending partition extending from said connecting portion to divide the structure into two compartments, and illuminative elements co-operating with said reflector portions, one element being located in the compartment at one side of said partition and the other being located in the compartment at the opposite side of said partition.

2. A lighting structure comprising side portions of two parabolic reflectors connected to each other by an intermediate portion, an opaque partition extending vertically of the structure to separate or divide the lighting structure into two compartments, and illuminative, independently controlled elements co-operating with said reflector portion, one element being located at one side of the said partition and in the focal axis of the reflector portion at that side of the partition and the other element being located in the compartment at the opposite side of said partition and in the focal axis of the reflector portion at that side of the partition.

3. A unitary lighting structure comprising side portions of a pair of parabolic reflectors connected to each other by an intermediate portion, a vertically extending partition connected to said intermediate portion to divide the structure into two compartments, said partition extending at an angle to the longitudinal axis of the lighting structure and having its forward end substantially in line with the focal axis of one of said reflector portions.

4. A lighting structure comprising side portions of a pair of parabolic reflectors connected to each other by an intermediate portion, a vertically extending opaque reflecting partition connected to said intermediate portion and dividing the structure into two compartments, and illuminative elements co-operating with said reflector portions, one of said elements being in the compartment at one side of the partition and in the focal axis of the reflector at that side of the partition, the other illuminative element being in the compartment at the opposite side of said partition and in the focal axis of the reflector portion at that side of the partition, the forward end of said partition being substantially in line with the focal axis of one of said reflector portions.

This specification signed this 27th day of January, 1922.

CHARLES M. WALES.